Dec. 13, 1960 H. LOEVENSTEIN ET AL 2,964,179
SEPARATING, WASHING AND CLASSIFYING SOLIDS
AND CONTINUOUS APPARATUS THEREFOR
Filed Sept. 11, 1956 4 Sheets-Sheet 1

*INVENTOR.*
HIRSCH LOEVENSTEIN
CARL W. CARLSON
LELAND B. GUNDERSON,

BY
ATTORNEY

Fig. 3

*INVENTOR.*
HIRSCH LOEVENSTEIN
CARL W. CARLSON
LELAND B. GUNDERSON,

BY *Eugene D. Farley*
ATTORNEY

Fig. 4

INVENTOR.
HIRSCH LOEVENSTEIN
CARL W. CARLSON
LELAND B. GUNDERSON,
ATTORNEY

United States Patent Office 2,964,179
Patented Dec. 13, 1960

2,964,179

SEPARATING, WASHING AND CLASSIFYING SOLIDS AND CONTINUOUS APPARATUS THEREFOR

Hirsch Loevenstein, Carl W. Carlson, and Leland B. Gunderson, Salem, Oreg., assignors to Harvey Machine Co., Inc., Torrance, Calif., a corporation of California Filed Sept. 11, 1956, Ser. No. 609,254

8 Claims. (Cl. 209—12)

This invention relates to method and apparatus for separating, washing and classifying solids contained in a liquid slurry.

In chemical industry there are many instances where it is necessary to separate solids from liquids, to wash the solids, and to classify them. In some instances, separation of the solids from the liquids is all that is required. In others, the solids must be washed after separation. In still other instances, all three of these operations must be performed.

For example, in the aluminum industry bauxite or other aluminum minerals are digested with caustic soda in an autoclave. The resulting solution of sodium aluminate is separated from the red mud residue, which then is washed with water. The clear, pregnant solution is diluted with water to hydrolyze the sodium aluminate and precipitate the aluminum as aluminum trihydrate. The latter then is separated from the solution, classified and further processed or applied to its various industrial uses. In this sequence of operations use advantageously may be made of apparatus such as is described herein for separating the solids from the liquids, washing the solids, and classifying them.

Presently available methods and apparatus for performing the foregoing operations are relatively complicated, require apparatus of excessively high capacity and are not sufficiently flexible to permit carrying out easily a selected one or any combination of the operations in the same apparatus. Also, they do not permit the simultaneous separation, washing and classification of the solids. Still further, they require careful control and a relatively large number of skilled operators.

Accordingly, it is the general object of this invention to provide method and apparatus for separating, washing, and classifying solids which overcome the foregoing deficiencies of the prior art and which makes possible:

(1) The continuous separation of solids from a liquid.

(2) The simultaneous separation and washing of the solids.

(3) The simultaneous separation, washing, and classification of solids.

(4) The separation of solids from a slurry without filtering the slurry.

(5) The separation of solids from a slurry without filtering the slurry and without withdrawing a significant amount of the liquid content thereof.

(6) Washing solids suspended in a liquid while the solids are being separated therefrom, using a minimum quantity of washing liquid so as not to dilute the mother liquor unnecessarily.

(7) The separation of the fine from the coarse particles of a slurry, thereby making possible transmitting the fines to another processing sequence, e.g. back to a precipitator.

(8) The use of apparatus of simple, inexpensive design and comparatively small volume which occupies a minimum of space and does not include costly and bulky filters.

The manner in which the foregoing and other objects of this invention are accomplished will be apparent from the accompanying specification and claims considered together with the drawings, wherein:

Generally stated, the presently described method of separating solids from a liquid comprises maintaining a `iquid slurry in a vessel having an open end, forcing the slurry against the open end of the vessel and directing a stream of liquid across the open end in such a manner that the stream impinges upon the slurry in the vessel. The stream flow upstream from the open end is maintained at least equal to the stream flow downstream therefrom.

As a result, there is established a liquid seal across the open end of the vessel. This prevents substantial discharge of the liquid content of the slurry through the open end. However it permits entrainment of the slurry solids in the stream, thereby separating the solids from the liquid.

If desired, the stream flow upstream from the open end of the vessel may be increased until it is greater than the stream flow downstream therefrom. As a result, surplus liquid will enter the vessel, washing the solids, and forming a second liquid stream.

Fresh slurry then may be introduced into the second stream at an intermediate point so that the fines will be washed away in the direction of stream flow while the heavies may be forced in a countercurrent direction by gravity, or mechanically, into the vessel in which their separation from the liquid is effectuated. In this manner the solids may be separated, washed and classified simultaneously in unitary apparatus.

Considering the foregoing in greater detail and with particular reference to the drawings:

THE SOLIDS SEPARATING APPARATUS OF FIGURE 1

Figure 1:
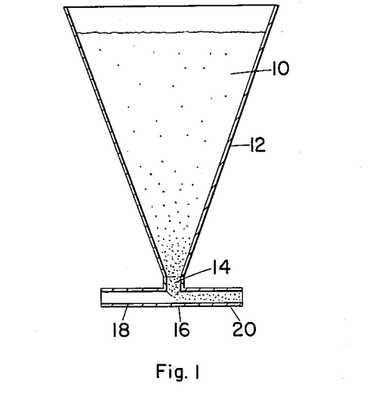
Fig. 1 is a schematic sectional view in elevation illustrating the presently described method and apparatus for separating solids from liquids.

Simple apparatus illustrating the herein described method and apparatus for separating solids from liquids is illustrated schematically in Fig. 1. A quantity of liquid slurry 10 which may comprise an aqueous suspension of aluminum trihydrate is contained in a vessel 12 which has a tapered, preferably conical, bottom.

The bottom of the vessel is formed with an opening 14 preferably of restricted cross section. A conduit indicated generally at 16 extends across the opening at the bottom of the vessel. This conduit, although continuous, may be considered to comprise two sections. The first section 18 is upstream from the opening; the second section 20 is downstream therefrom.

A pump of suitable design, not illustrated, is connected to conduit 16 for pumping therethrough a stream of liquid which may be identical or different from the liquid contained in slurry 10. The pumped liquid may comprise, for example, liquid in which the solids are to be washed, or with which they are to be further reacted.

The stream of liquid through conduit 16 is controlled so that the flow through the upstream segment 18 is at least equal to the flow through the downstream segment 20. In this manner there is provided a liquid seal across opening 14 which prevents slurry 10 from flowing out through the conduit.

Consequently the solid particles present in the slurry gravitate downwardly in vessel 12 to opening 14. There they are entrained in the liquid stream passing through conduit 16 and separated from the liquor in the vessel without filtering and without removing a significant portion of the liquor.

THE SOLIDS SEPARATING APPARATUS OF FIGURE 2

Figure 2:
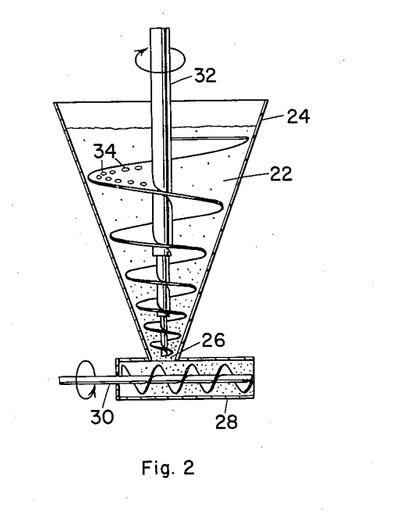
Fig. 2 is a schematic sectional view in elevation illustrating another novel method and apparatus for separating solids from liquids.

To assist in the separation of the solids from the liquor, apparatus illustrated schematically in Fig. 2 may be employed. In this embodiment slurry 22 is contained in a vessel 24 which again has a tapered or conical lower portion and a restricted opening 26 at its bottom. This opening may communicate with a tubular chamber 28. A motor driven screw 30 is mounted for rotation in this chamber, longitudinally thereof.

Also, a motor driven, tapered packing or companion screw 32 is rotatably mounted in a vertical position in vessel 24. The flights of this screw may be of progressively reduced pitch and may be provided with a plurality of perforations 34. They touch or are spaced a short distance from the side walls of the vessel.

As screw 32 rotates in the indicated direction, it engages the solid particles contained in the slurry and forces them downwardly, thereby packing them together and squeezing out the liquor therefrom. The packing action of the screw is attributable to two factors: First, the progressively reduced pitch of the screw flights; and second, the tapered configuration of the screw which works in a conical vessel. In many instances, the conical compression per se may be sufficient to induce the desired degree of packing. In such a case the screw flights need not be of progressively reduced pitch.

As the solids are packed in the bottom of the vessel, they form an effective seal which prevents substantial migration of the liquid content of the vessel out through opening 26, provided the amount of solids admitted to the apparatus per unit time remains substantially constant. It will be apparent that if the solids input is reduced materially, the plug at the bottom of the vessel may be broken, permitting passage of the liquid.

Upon continued operation of the apparatus, the solids which have been forced selectively toward the bottom of the vessel are driven into chamber 28, where they may be removed by motor driven screw 30. In this manner separation of the solids is achieved with very little of the mother liquor being carried away with them.

After being expressed from the solids by the action of the screw, the mother liquor flows upwardly toward the top of the vessel. During its progress, it either passes through perforations 34 in the flights of screw 32, through the space between the flights and the side walls of the vessel if such has been provided, or through both the perforations and the space between screw flights and vessel side walls if both of these passageways have been provided. It should be noted that the herein described apparatus is flexible in this respect and that where sufficient clearance is afforded between the screw flights and the side walls of the vessel, perforations 34 may be omitted altogether.

The solids separating apparatus of Fig. 2 thus affords a means of separating solids from a liquid wherein a plug of the separated solids serves the same purpose as the liquid seal of the embodiment of Fig. 1 in that it prevents migration of the liquid content of the slurry contained in the vessel from migrating out through the opening at the bottom thereof. However, in contrast to the apparatus of Fig. 1, the apparatus of Fig. 2 does not permit washing of the solids prior to their separation. Accordingly, although apparatus including the liquid seal may be used satisfactorily in some applications, in other applications it may be preferred to employ apparatus which utilizes both the liquid seal and the packing screw. Such apparatus is illustrated in Fig. 3.

THE SOLIDS SEPARATING AND WASHING APPARATUS OF FIGURE 3

Figure 3:
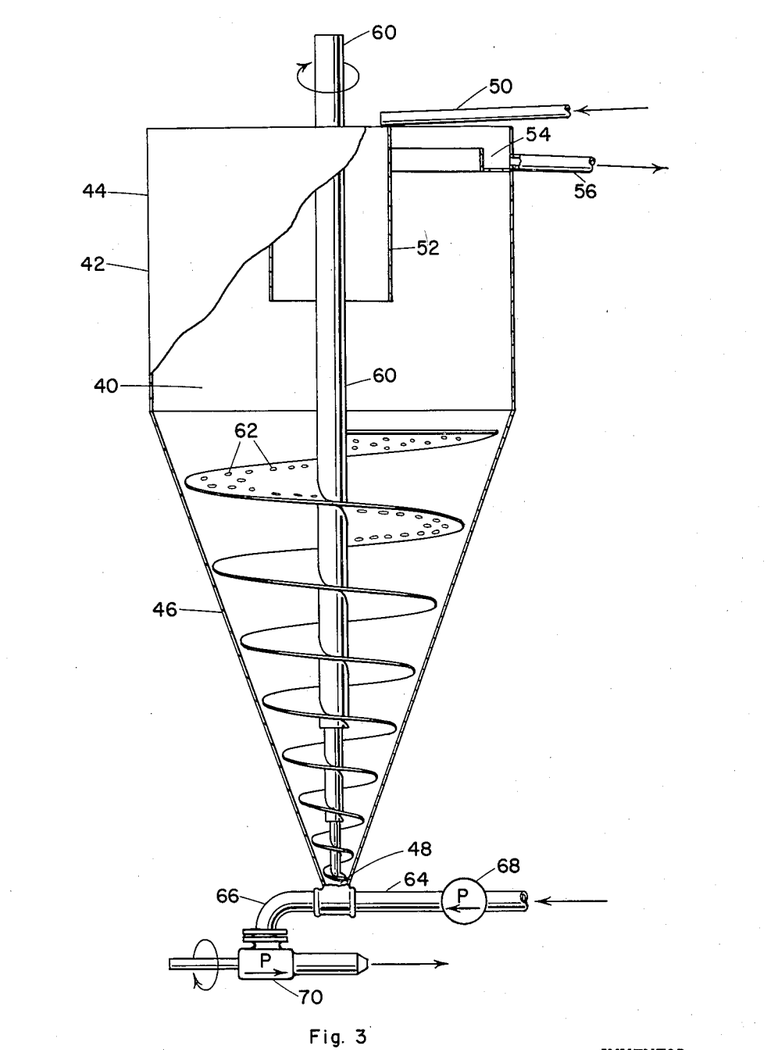
Fig. 3 is a sectional view in elevation illustrating a method and apparatus which combine features of the solids separating method and apparatus of Figs. 1 and 2 and which may be applied also to the washing of the solids prior to their separation from the liquid.

In the form of the invention illustrated in Fig. 3, the principles of the liquid seal and the packing or compression screw described above in connection with Figs. 1 and 2 are used simultaneously not only for separating the solids from a liquid slurry, but also for washing the solids preliminary to their separation. To this end a slurry 40 is introduced into a vessel indicated generally at 42, the upper portion 44 of which is cylindrical in cross section and the lower portion 46 of which is conical and tapered downwardly. The conical bottom of the vessel is truncated to provide an opening 48 which corresponds to openings 14, 26 of the previously described forms of the invention.

Slurry is introduced continuously into the vessel through conduit 50 which empties into a feedwell 52. An overflow launder 54 of conventional construction is provided at the top of the vessel. It communicates with a conduit 56.

A compression screw 60 is mounted for rotation vertically in the vessel interior, the shaft penetrating the feedwell 52. The working portion of the screw is housed in conical portion 46 of the vessel. It is provided with flights of gradually reduced pitch and with perforations 62.

If desired, the flights of the screw may be spaced slightly from the side walls of the vessel in which case perforations 62 may be omitted altogether. Also, the screw is tapered downwardly to conform to the tapered interior of the vessel. As has been described above with reference to the embodiment of Fig. 2, the action of the screw packs the solid particles present in the slurry in the region adjacent opening 48 in the bottom of the vessel.

As in the embodiment of Fig. 1, a liquid seal is provided at the bottom of vessel 42. The seal is formed by a conduit having, with reference to opening 48, an upstream section 64 and a downstream section 66. A pump 68 is provided in the upstream section of the conduit and another pump 70 in the downstream segment thereof. If desired, one of these pumps may be replaced with a valve.

In the continuous operation of the apparatus of Fig. 3, slurry 40 is introduced continuously through conduit 50 into feedwell 52 and thence into vessel 42. The separation of its components commences immediately, the solid particles gravitating downwardly until they reach the flights of screw 60.

When this occurs they are urged downwardly by the conical compression induced by the tapered configuration of the bottom portion of the apparatus and by the packing action of the gradually decreasing pitches of the screw flights. Liquor expressed from the solids escapes through perforations 62 or past the edges of the screw flights. Accordingly, the screw squeezes out almost all of the mother liquor from the solids and forms a thick paste which is discharged through opening 48.

During this sequence, the slurry in vessel 42 is prevented from running out opening 48 by a liquid seal. This is created by the stream forced by pumps 68, 70 through upstream conduit 64 and downstream conduit 66 and flowing past the opening. If the two pumps operate at the same speed the volume of the stream flowing through the upstream conduit will be substantially equal to that flowing through the downstream conduit. As a result, the paste forced through opening 48 by screw 60 is entrained in the stream and carried away, accompanied by only a negligible amount of mother liquor.

In this manner the solids may be separated effectively from the liquor. Such a separation might be useful, for example, in a two-step digestion process in which a solid after being digestion in the first step must be separated from the pregnant liquid before being digested in the second step. In such a case the liquid introduced as the liquid seal may comprise the reagent to be used for the second digestion step.

As has been indicated above, not only may the solids be separated from the liquid content of the slurry, but they also may be washed prior to such separation. Thus they may be washed continuously by adjusting the relative outputs of pumps 68 and 70 so that a greater amount of liquid is pumped by the former than by the latter.

The surplus liquid then will pass up through opening 48 in the conical portion 46 of vessel 42, through the perforations 62 in the flights of screw 60 and/or around the edges thereof, and up into the cylindrical portion 44 of the vessel. During its upward travel it washes the solids so that they become relatively free of mother liquor. It also mixes with the liquid component of the slurry and the resulting diluted liquor passes into overflow launder 54 and out through conduit 56. Accordingly as products of this procedure there are formed a washed solid and a liquor which is free from solids and slightly diluted by the washing liquid.

The operation of the apparatus of Fig. 3 is further illustrated by the following examples which illustrate the applicability of the apparatus in a two-stage digestion process in which a solid, after being digested in a first stage, must be separated from a pregnant liquid preliminary to being digested in a second stage.

*Example 1*

A calcium aluminate slag was digested in two stages with a sodium carbonate solution. After the first digestion stage the partially digested slag was separated from the pregnant liquor by continuously introducing the digestion mixture into vessel 42 of Fig. 3 through conduit 50.

A liquid seal was established at the bottom of the vessel by pumping fresh sodium carbonate solution through conduits 64, 66, the fresh sodium carbonate solution being the reagent to be employed in the second stage digestion of the mud. The amount of liquid passing through liquid seal conduit 64 was maintained substantially equal to that passing through liquid seal conduit 66. Also, the volume of solution continuously withdrawn through conduit 56 was maintained substantially equal to the volume continuously introduced into the apparatus through conduit 50.

Accordingly, the solids content of the slurry introduced through conduit 50 settled downwardly in the vessel, being packed at the bottom thereof by the action of screw 60. There it was entrained by the sodium carbonate stream comprising the liquid seal and carried away for further digestion in a second stage.

The pregnant alumina-containing liquor leaving the apparatus via overflow conduit 56 was continuously clear and free from mud. That it was not diluted by the sodium carbonate solution used for the liquid seal was determined by repeated analyses of the solution entering the vessel via line 50, and that leaving the vessel via conduit 56. The results of these analyses are given in Table I below.

TABLE I

| Time | Alumina in solution in grams per liter | |
|---|---|---|
| | Entering | Leaving |
| Noon | 34.52 | 35.42 |
| 3 p.m | 30.47 | 30.39 |
| 6 p.m | 34.07 | 32.09 |
| 9 p.m | 29.75 | 30.65 |
| 12 p.m | 28.58 | 28.58 |

It is apparent from the foregoing that an effective separation of the alumina-containing liquor from the partially digested mud was obtained without contamination of the solution with the liquid used for the liquid seal.

*Example 2*

This example illustrates the separation and washing of solid particles from a liquid slurry in which they are contained using the apparatus of Fig. 3.

A sodium aluminate solution resulting from the digestion of a slag with sodium carbonate was treated with carbon dioxide in a precipitator for precipitation of aluminum trihydrate. This formed an aluminum trihydrate slurry which was introduced continuously through line 50 into the apparatus of Fig. 3. A liquid seal was established at the bottom of the apparatus by passing water through lines 64, 66. The mother liquor was withdrawn continuously through overflow conduit 56.

The feed rate of slurry through the apparatus through line 50 was 45 gallons per hour. Water was passed through upstream liquid seal conduit 64 at the rate of 16.5 gallons per hour, and through downstream liquid seal conduit 66 at the rate of 15 gallons per hour. Hence 1.5 gallons per hour of water were diverted upwardly through the apparatus, joining the mother liquor and passing with it out through overflow conduit 56. This resulted in effective washing of the alumina particles which were packed in the bottom of the apparatus by the operation of screw 60, while diluting the mother liquor only 3.3%.

During the operation of the apparatus the effluent water of the liquid seal and the solid aluminum trihydrate contained therein were analyzed periodically to determine their sodium oxide content. This gave a measure first of the loss of sodium oxide in the liquid seal water and secondly of the purity of the alumina obtained as an end product. The results were as follows:

TABLE II

| Time | $Na_2O$ in Water (g.l.) | $Na_2O$ in $Al_2O_3$ (percent) |
|---|---|---|
| 6 p.m | 3.68 | .41 |
| 7 p.m | 3.45 | .38 |
| 8 p.m | 3.28 | .35 |
| 9 p.m | 3.35 | .31 |
| 10 p.m | 3.72 | .41 |
| 11 p.m | 3.41 | .41 |

These figures establish conclusively that the aluminum trihydrate product had been effectively freed of sodium oxide without loss of a significant quantity of that reagent to the liquid seal water.

THE SOLIDS SEPARATING AND WASHING APPARATUS OF FIGURES 4, 5, 6 AND 7

Still another form of apparatus which may be employed for both separating and washing solids contained in a liquid slurry is illustrated in Figs. 4, 5, 6 and 7. Like the previously described embodiment, the apparatus of these figures includes a conical separation vessel 80. This vessel is provided with a restricted opening 82 near its bottom.

Figure 4:
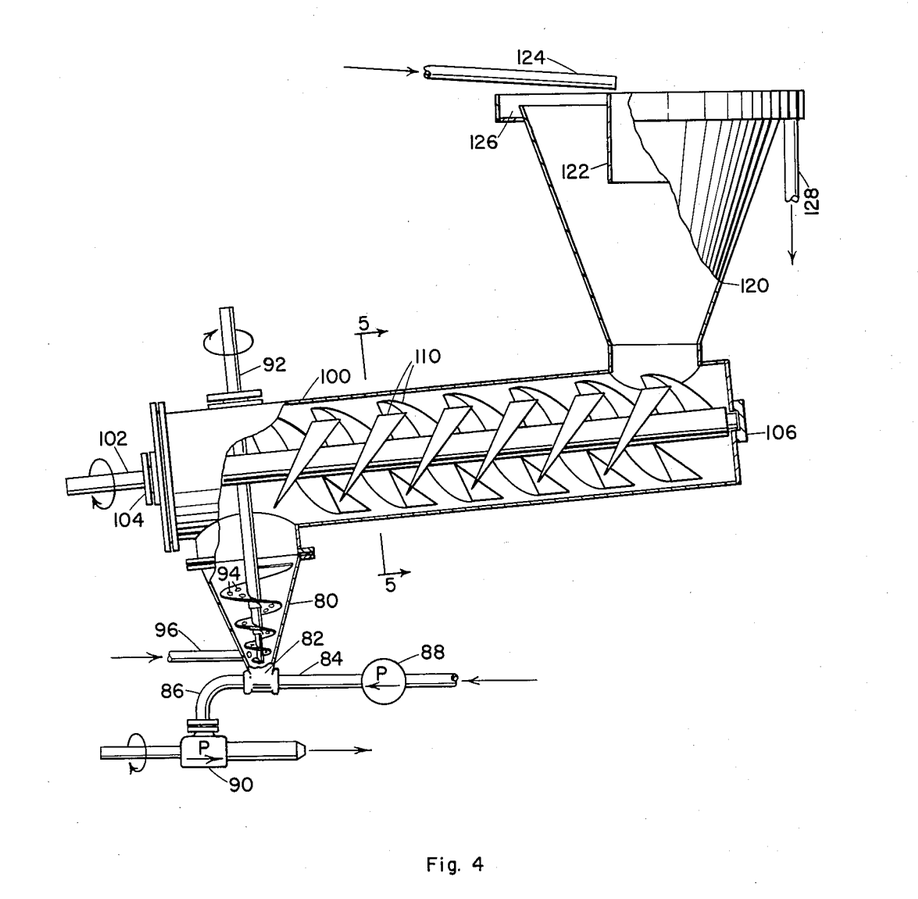
Fig. 4 is a view in side elevation, partly in section, illustrating still another form of the invention wherein means are provided for separating the solids and also for washing them.

A liquid seal is established across the bottom by means of upstream conduit 84 and downstream conduit 86 directed across the opening and communicating therewith. A pump 88 and another pump 90 which may be operated at the same or differential rates cooperate in establishing a stream of liquid across the opening, the volume of flow in the upstream conduit 84 being at least as great as that in the downstream segment 86.

A compression screw 92, which preferably is driven by a variable speed motor, works in vessel 80. As before, the flights of this screw have a downwardly decreasing pitch and perforations 94 are provided to permit the passage of liquid through the flights.

A conduit 96, which communicates with the lower portion of the vessel, permits the introduction of additional quantities of liquid into the vessel for a purpose which will appear hereinafter.

The upper portion of vessel 80 communicates with a washing chamber which preferably comprises a tube 100. This tube is inclined downwardly in the direction of vessel 80. For best operation, the degree of inclination is not less than 2° nor more than 45°. It is provided with means for agitating a slurry as it passes through the tube.

In the illustrated form, the agitating means comprise a shaft 102 which is suitably mounted in bearings 104, 106 and which is rotated in the indicated direction by a variable speed motor. Mounted on the shaft are a plurality of shovel-shaped agitators, the construction of which is detailed in Figs. 5, 6, and 7. Each of the agitators is made up of three plates. One of these, plate 112, is fixed to shaft 102. Another, plate 114, is roughly triangular in outline and is welded to the end of plate 112 at a substantial angle thereto. The apex of this plate is adjacent shaft 102.

Figure 5:
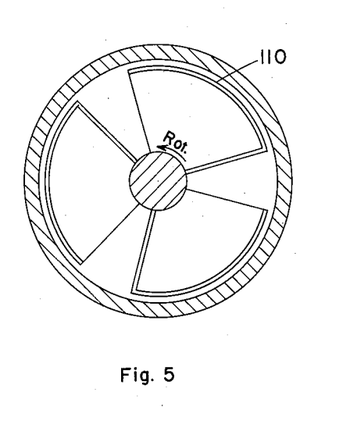
Fig. 5 is a sectional view taken along line 5—5 of Fig. 4 and illustrating agitating means employed in the solids washing unit of the apparatus of that figure.
Figure 6:
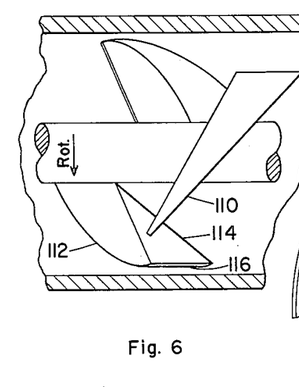
Figs. 6 and 7 are detail views illustrating still further the agitating elements employed in the washing unit of the apparatus of Fig. 4.
Figure 7:
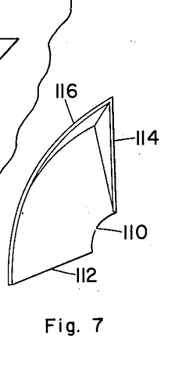

The third plate 116 is welded to plates 112, 114 in such a manner that a shoevel-like recess is provided. The inclination of the agitators on the shaft is such that sedimentary solids on the bottom of the tube are picked up by the agitators, moved upwardly, and released, whereupon they percolate down through the liquid contained in the tube and are washed effectively.

A conical or cylindrical settling vessel 120 communicates with the upper end of tube 100. This vessel is provided with a feedwell 122 into which slurry may be passed by means of infeed conduit 124. It also is equipped with an overflow launder 126 with outlet 128, this being of conventional construction.

The operation of the continuous combination separation and washing apparatus of Figs. 4–7 is as follows:

A liquid seal is established at the bottom of separating vessel 80 by establishing a flow through conduits 84, 86 such that the flow through conduit 84 is at least as great as that occurring through conduit 86. Where the solids are to be washed as well as separated, the flow through upstream conduit 84 is increased until it is greater than that passing through downstream conduit 86.

Only a small amount of excess liquid need be introduced in this manner. In the usual case the amount thus introduced does not exceed 10% of the volume of the slurry.

If it is desired to augment the amount of washing water thus admitted additional water may be introduced in predetermined amounts through conduit 96.

The excess liquid mixed with the liquid separated from the slurry passes upwardly through separation vessel 80, through washing tube 100, through settling vessel 120 and out through overflow launder 126.

As a slurry or other liquid mixture containing suspended solid particles is introduced into settling chamber 120 via conduit 124 and feedwell 122, the solid particles which it contains gravitate downwardly through the settling chamber while the clear liquor remaining passes upwardly through the overflow launder 126 together with the excess wash liquor introduced through conduits 84 and 96.

The particles next enter downwardly inclined washing tube 100 where they continue their gravitationally impelled downward course. They are assisted in their travel, and washed by the action of the shovel-shaped agitator blades 110 on shaft 102. These scrape the particles from the bottom of the tube, lift them upwardly and backwardly and release them near the top of the tube so that they percolate downwardly through the liquor in the manner described above.

The washed particles then pass into the top of conical separation vessel 80. There they continue to move downwardly, being assisted by the action of compression screw 92. As they descend, they meet the fresh wash liquor introduced through conduits 84 and 96 and accordingly are washed further. When they reach the bottom of the vessel, they are entrained in the sealing stream of liquid passing through conduits 84, 86 and thus removed without removing an important amount of the liquor, liquor losses being kept under 1% in a typical instance.

The operation of the apparatus of Figs. 4–7 is further illustrated by the following examples:

Example 3

This example illustrates the operational efficiency of the apparatus of Figs. 4–7 with and without the liquid seal applied.

A calcium aluminate slag was digested with sodium carbonate to form a slurry composed of a mud suspended in a sodium aluminate liquor containing excess sodium oxide.

The slurry was fed continuously into the apparatus through conduit 124 at a substantially constant rate. At first a liquid seal was not established at the bottom of separating chamber 80. Instead, wash water was introduced in conventional manner through a conduit (not illustrated) communicating with the lower end of washing tube 100. Wash water in suitable amount was introduced continuously into the apparatus through this tube and withdrawn continuously from the bottom of separator 80.

After an operating period of 4 hours the flow of water through the conduit communicating with washing tube 100 was cut off and a liquid seal established at the bottom of separator 80 by establishing a flow of water through liquid seal conduits 84, 86. The flow through conduit 84 was maintained slightly greater than that through conduit 86. Accordingly part of the water was diverted upwardly through separator 80 and washing tube 100, where it washed the solids content of the slurry, and thence into settling chamber 120 where it joined the liquor discharged through overflow conduit 128. The solids, in turn, after being washed in tube 100, passed into separator 80 where they were packed by the action of screw 92 and carried away by the water stream in conduits 84, 86.

To test the efficiency of the apparatus with and without the liquid seal applied periodic determinations were made of the sodium oxide content of the feed slurry entering the apparatus through conduit 124, of the liquor leaving the apparatus through conduit 128, and of the water leaving the apparatus through conduit 86 of the liquid seal. The results are set forth in Table III below.

TABLE III

| Time | Na₂O content in grams per liter | | |
|---|---|---|---|
| | Slurry | Liquor | Liquid Seal Effluent Water |
| (a) Without Liquid Seal | | | |
| 10 a.m. | 33.48 | 11.16 | 12.6 |
| 12 a.m. | 33.57 | 10.85 | 12.6 |
| 2 p.m. | 33.17 | 15.81 | 12.8 |
| (b) Liquid Seal Applied | | | |
| 3 p.m. | 35.03 | 29.00 | 2.5 |
| 4 p.m. | 35.96 | 31.30 | .5 |

From a consideration of the foregoing values, it is apparent that when the herein described liquid seal is not applied and the wash water passes through the apparatus in the conventional manner, a very substantial amount of sodium oxide is lost to the wash water. Also, the liquor separated from the solids is diluted to a high degree. However, when the liquid seal is applied, loss of sodium oxide to the effluent water is negligible and only slight dilution of the liquor occurs.

*Example 4*

This example, considered together with Examples 5 and 6 below, demonstrates that the liquid seal flow rate may vary substantially without significantly affecting the efficiency of the solids washing and separating operations.

The procedure outlined in Example 3 above was repeated using the liquid seal. A slurry composed of a mud suspended in a sodium aluminate liquor containing excess sodium oxide was fed continuously to the apparatus through conduit 124 at a rate of 60 gallons per hour. Water was passed through the liquid seal at a rate of 180 gallons per hour. At periodic intervals the sodium oxide content of the slurry fed into the apparatus through line 124, of the liquor leaving the apparatus through line 128, of the water leaving the apparatus through line 86, and of the mud discharged from the bottom of separating cylinder 80 was determined. The results are given in Table IV.

TABLE IV

| Time | Na₂O content in grams per liter | | | Mud, percent |
|---|---|---|---|---|
| | Slurry | Liquor | Liquid Seal Effluent Water | |
| 1 p.m. | 28.76 | 28.37 | .31 | 1.3 |
| 4 p.m. | 31.78 | 29.30 | .50 | 1.3 |
| 8 p.m. | 35.50 | 30.38 | .31 | .66 |
| 12 p.m. | 37.72 | 32.86 | .25 | .62 |

It thus was found that the loss of sodium oxide in the effluent water was 3.08% and in the mud 2.3% by weight. The dilution by the wash water of the liquor leaving the apparatus varied between 1.38% and 14.4%, the average being 7.15%.

*Example 5*

This example illustrates the application of the apparatus of Figs. 4–7 using a somewhat reduced water flow through the liquid seal.

The procedure of Example 4 was repeated using, however, a flow of 120 gallons per hour of water through liquid seal conduit 86 instead of the flow of 180 gallons per hour employed in the procedure of Example 4. The results were as follows:

TABLE V

| Time | Na₂O content in grams per liter | | | Mud, percent |
|---|---|---|---|---|
| | Slurry | Liquor | Liquid Seal Effluent Water | |
| Noon | 31.93 | 35.73 | .56 | .62 |
| 2 p.m. | 32.55 | 25.42 | .71 | .63 |
| 4 p.m. | 32.24 | 26.04 | .64 | .69 |
| 6 p.m. | 32.86 | 32.24 | .62 | .79 |
| 8 p.m. | 31.93 | 27.59 | .56 | .60 |
| 10 p.m. | 33.17 | 30.69 | .68 | .64 |

In this case the loss of sodium oxide in the liquid seal effluent water was 3.86% and in the mud 1.6% by weight. The dilution of the liquor leaving the apparatus varied between 1.87% and 21.8%, the average being 13.8%.

*Example 6*

The procedure of Example 4 again was repeated using, however, a stream flow in the liquid seal conduit of about 60 gallons per hour. The results are given in Table VI below.

TABLE VI

| Time | Na₂O content in grams per liter | | | Mud, percent |
|---|---|---|---|---|
| | Slurry | Liquor | Liquid Seal Effluent Water | |
| 3 p.m. | 31.62 | 28.37 | .28 | .85 |
| 6 p.m. | 31.62 | 25.58 | .37 | .98 |
| 9 p.m. | 29.45 | 28.68 | .43 | .73 |
| 12 p.m. | 33.79 | 30.07 | .62 | .93 |

It will be seen from a consideration of the foregoing values that when the liquid seal flow was but 60 gallons per hour, the loss of sodium oxide in the liquid seal effluent averaged 1.38% and in the mud 2.1% by weight. The extent of dilution of the liquor leaving the apparatus varied between 2.62% and 19.1%, the average being 10.4%.

Also, from a comparison of the results set forth in Examples 4, 5 and 6 it will be apparent that the efficiency of the liquid seal utilized in the herein described apparatus is maintained even though the amount of liquid used in maintaining the seal is varied over wide limits.

THE SOLIDS SEPARATING, WASHING AND CLASSIFYING APPARATUS OF FIGURE 8

Figure 8:
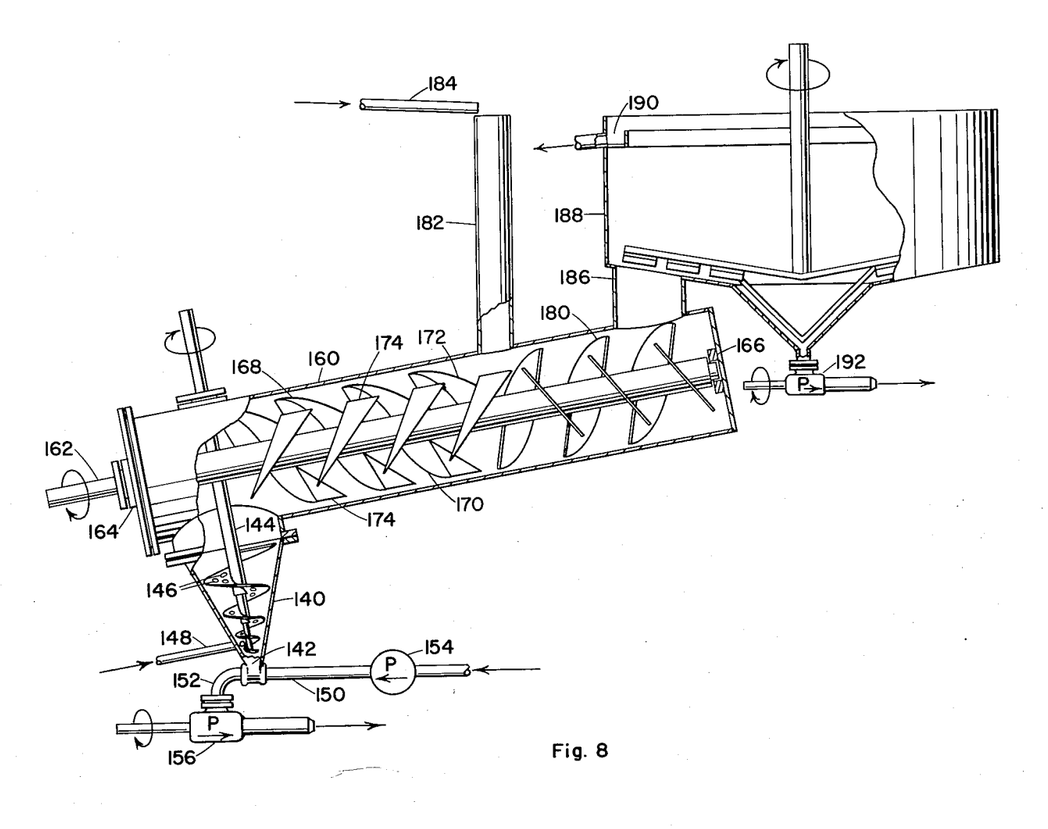
Fig. 8 is a sectional view in side elevation of still another form of the herein described apparatus wherein means are provided not only for separating and washing the solids but also for classifying them.

Still another form of our invention is illustrated in Fig. 8. In this embodiment means are provided not only for separating and washing the solids, but also for classifying them.

The Fig. 8 apparatus is similar in many respects to that of Fig. 4. Thus it includes a separation vessel 140 which may be substantially identical with vessel 80 of Fig. 4. It is generally conical in shape and provided with a restricted opening 142 at its lower end.

A compression screw 144 works in the vessel. This screw has perforations 146 through its flights and/or enough clearance to afford a passageway for the liquid moving upwardly through the vessel. In addition, the flights are tapered to conform to the contour of the cone, which they almost touch, and are of reduced pitch as they descend therein. A conduit 148 communicates with the vessel just above the opening in the bottom thereof.

Also, a liquid seal such as is described in the previously described embodiments is present. This is formed by means of communicating conduits 150, 152 which are upstream and downstream, respectively, from opening 142. Pumps 154, 156 are present in the line and are controlled in such a manner as to insure that the flow through the upstream conduit 150 is at least equal to that of the downstream conduit 152. Accordingly a liquid seal is established and the liquor in vessel 140 is prevented from entering the conduit.

A combination washing and classification chamber is associated with separation vessel 140. This chamber comprises an inclined tube 160 sealed at both ends and communicating with vessel 140 at its lower end. The angle of inclination of tube 160 is a function of the difference in size between the fine and coarse particles of the slurry and hence may be predetermined as required for processing a given slurry.

Agitating means for agitating solids contained in the tube are provided and comprise a shaft 162 rotatably mounted in bearings 164, 166 and coupled to a variable speed motor which drives it in the indicated direction.

Two classes of elements are mounted on the shaft. The first, indicated generally at 168, comprises shovel-shaped agitating elements which are stationed in the lower portion of the tube and may be identical with elements 110 mounted on shaft 102 of Fig. 4.

Thus these elements comprise three plates welded together and including plate 170 which is rigidly fixed to the shaft, plate 172 which is fixed to the outer edge of plate 170 at a substantial angle thereto and triangular plate 174 which interconnects the foregoing two plates. These agitators are arranged on the shaft at an angle calculated to scrape solid material from the bottom of the tube, lift it, move it backwardly (to the right as viewed in Fig. 8) and release it near the top of the tube so that it settles down through the liquid contained therein.

The second class of elements present in the upper portion of tube 160 comprise driving plates 180 which may be similar to or identical with plates 170 of shovel agitators 168. Their purpose is to move the coarser grains contained in the slurry slowly downwardly in the tube without lifting them upon the liquid. Hence the inclination of driving elements 180 is just the opposite of that of agitators 168 so that the coarse particles which they engage are forced against the current in the tube until they come within the sphere of activity of agitators 168.

The relative proportion of tube 160 which is occupied by shovel agitators 168 and driving plates 180 is somewhat variable, depending upon the proportion of fine and heavy particles contained in the slurry to be treated. Whatever the proportion, a conduit in the form of a standpipe 182 fed with fresh slurry from pipe 184 communicates with the tube at substantially the point of junction of the two types of elements.

The upper terminus of tube 160 communicates through connector 186 with a thickener or settling vessel 188. This is of conventional construction and is provided with an overflow launder 190 for removal of liquid. Its bottom is conical and communicates with a pump 192 by means of which thickened solids composed of the fines are removed.

The operation of the combination apparatus of Fig. 8 is as follows:

The apparatus is filled with slurry which is to be treated and a liquid seal established at opening 142 by pumping a stream of liquid, for example, a liquid to be used for washing and conveying the separated slurry solids, through conduits 150, 152. Pumps 154, 156 are regulated so that the volume of liquid passing through conduit 150 is greater by a predetermined amount than that passing through conduit 152. Hence the liquid contents of separating chamber 140 are prevented from passing out through opening 142.

Also, the excess liquid passes from conduit 150 through opening 142 into vessel 140, where it mingles with additional liquid introduced through conduit 148, if any is thus admitted and washes the solids. The liquid passes in a continuous stream upwardly through the washing segment of tube 160, through the classifying segment of tube 160 through thickener 188 and out through overflow 190.

Fresh feed comprising a liquid containing suspended solid particles is introduced into standpipe 182 from conduit 184. The solid particles of the feed gravitate downwardly into tube 160. There the fines are entrained in the aforementioned stream through the tube and are carried into thickener 188 where they are separated in the usual manner. Thereafter they may be removed by pump 192 and returned to the operation for further crystal growth, or separated from the liquid in a separator such as is shown in Fig. 3.

The heavier solids gravitate down toward the bottom of tube 160 where they are engaged first by paddle elements 180. These force them down to the lower section of the tube where they are picked up by shovel agitators 168. As has been discussed above, these scrape the particles from the bottom of the tube, lift them, carry them backwardly a short distance and release them so that they fall down through the liquid. This washes them and gives the liquid stream through the tube an opportunity to entrain the lighter particles and carry them into the thickener 188.

The heavy particles, on the other hand, ultimately reach the lower end of tube 160 and pass into the top of separating vessel 140. There they gravitate downwardly, being assisted by the packing action of compression screw 144 which forces them down toward opening 142 at the lower end of the vessel. There they are entrained in the liquid seal stream flowing in communicating conduits 150, 152 and carried away.

In this manner the slurry introduced into the apparatus through standpipe 182 is processed for separation of the solid particles, and for contemporaneously washing them to free them from the mother liquor and classifying them into fine and coarse particles, the degree of such classification being controlled as required by predetermining the point of introduction of the slurry into tube 160.

Hence it will be apparent that by the present invention we have provided method and apparatus for separating, washing and classifying solid particles contained in a liquid medium, for example, aluminum trihydrate particles contained in a slurry. The apparatus is adapted to large scale, continuous operation. The separating, washing and classifying operations are carried out contemporaneously. Furthermore, the apparatus is simple in construction, does not include bulky filter units, and occupies a minimum of space. Also, in spite of the fact that filtration steps are not involved, a clean separation of the solids from the liquid is achieved without loss of a significant amount of mother liquor.

It is to be understood that the form of our invention herewith shown and described is to be taken as a preferred example of the same and that various changes in the shape, size and arrangement of parts may be made without departing from the spirit of our invention or the scope of the subjoined claims.

Having thus described our invention, we claim:

1. Apparatus for separating, washing and classifying solids which comprises a conical vessel having an opening in its bottom portion, conduit means across the opening and communicating with the vessel, means for establishing a stream of liquid through the conduit means, stream flow control means associated with the conduit means for maintaining the stream flow upstream from the opening a predetermined amount greater than the stream flow downstream therefrom, thereby forcing liquid into the vessel and washing the solids content of the slurry, a tube inclined downwardly toward the top of the vessel and communicating therewith for receiving overflow liquid therefrom at said predetermined rate for carrying solids fines upwardly therewith, means for introducing fresh slurry into the tube at a point intermediate its ends, lifting and agitating means mounted within the tube for agitating the slurry as the heavies content thereof gravitates downwardly into the vessel, and means at the upper end of the tube for receiving the overflow liquid and its content of entrained fines.

2. The method of separating solids from a liquid, comprising introducing a mixture of solids and liquid into the upper end of a vessel having a bottom end tapering downwardly to a constricted solids outlet opening, which is unobstructed across its cross section, directing a stream of liquid across the outlet opening substantially normal thereto and in contact with the entire lower surface of the liquid content of the mixture at said unobstructed outlet opening, regulating the stream of liquid so that the flow thereof upstream from the outlet opening is at least equal to the flow thereof downstream from the outlet opening, thereby establishing a liquid seal across the outlet opening to prevent substantial discharge of the liquid content of the mixture into the downstream flow, forcing at least a portion of the solids content of the mixture toward the outlet opening for entrainment in the downstream flow, and withdrawing liquid adjacent the upper end of the vessel in amount substantially equal to the amount of liquid introduced into the vessel.

3. The method of claim 2 wherein regulation of the stream of liquid is made so that the upstream and downstream flows are equal, thereby preventing dilution of the liquid content of the mixture, forcing substantially the entire solids content of the mixture toward the outlet opening for entrainment in the downstream flow, and withdrawing the liquid content of the mixture from the upper end of the vessel in amount substantially equal to the liquid content of the mixture introduced into the vessel.

4. The method of claim 2 wherein regulation of the stream of liquid is made so that the upstream flow is greater than the downstream flow by an amount sufficient to divert liquid from the stream upwardly through the vessel in a flow sufficient only to wash the solids content of the mixture as they are forced downward toward the outlet opening, and withdrawing the diluted liquid content of the mixture from the upper end of the vessel, substantially free of solids, in amount substantially equal to the amount of liquid introduced into the vessel.

5. The method of claim 2 wherein regulation of the stream of liquid is made so that the upstream flow is greater than the downstream flow by an amount sufficient to divert liquid from the stream upwardly through the vessel in a flow sufficient to wash the larger sizes of solids as they are forced downward toward the outlet opening and to carry the smaller sizes of solids upwardly with the flow, and withdrawing the diluted liquid content of the mixture and the smaller sizes of solids carried thereby from the upper end of the vessel in amount such as to maintain the quantity of mixture in the vessel substantially constant.

6. The method of separating solids from a liquid, comprising establishing a continuous washing liquid flow having a vertically upward component originating at a solids discharge outlet and an upwardly inclined component continuing from the upper end of the vertically upward component, introducing a mixture of solids and liquid adjacent the upper end of the inclined component, agitating the solids content of the mixture in the inclined component while simultaneously impeding their downward progress, and regulating the washing liquid flow such that the solids content of the mixture is washed and yet is forced downward, countercurrent to the washing liquid flow, toward the discharge outlet, and withdrawing the diluted liquid content of the mixture adjacent the upper end of the inclined component in amount such as to maintain the quantity of mixture in the washing liquid flow substantially constant.

7. The method of separating solids from a liquid, comprising establishing a continuous washing liquid flow having a vertically upward component originating at a solids discharge outlet and an upwardly inclined component continuing from the upper end of the vertically upward component, introducing a mixture of solids and liquid adjacent the upper end of the inclined component, agitating the solids content of the mixture in the inclined component while simultaneously impeding their downward progress, and regulating the washing liquid flow such that the larger sizes of solids are washed and yet are forced downward, countercurrent to the flow, toward the discharge outlet and the smaller sizes of solids are carried upwardly with the flow, and withdrawing the diluted liquid content of the mixture and the smaller sizes of solids carried thereby adjacent the upper end of the inclined component in amount such as to maintain the quantity of mixture in the washing liquid flow substantially constant.

8. Apparatus for separating solids from a liquid, comprising a separating vessel for containing a mixture of solids and liquid and having a bottom end tapering downwardly to a single constricted solids outlet opening unobstructed across its cross section, conduit means connected intermediate its ends to the bottom end of the vessel and arranged substantially normal to the outlet opening, the conduit means having an opening registering with the said outlet opening, the conduit means being connected at one end to a source of liquid for directing a stream of the latter across the said outlet opening and across the entire lower surface of the liquid content of the mixture in the vessel, liquid flow control means in the conduit for adjusting the liquid stream flow such that the flow upstream from the said outlet opening is at least equal to the flow downstream from the said outlet opening, whereby to provide a liquid seal at said outlet opening to prevent substantial discharge of the liquid content of the mixture from the bottom of the vessel, an elongated inclined washing tube for containing the mixture of solids and liquid and connected adjacent its lower end to and communicating with the upper end of the vessel, shovel-shaped agitator means in the tube proportioned and arranged to engage settled solids in the tube and to lift such solids upwardly and toward the upper end of the tube and to then release them, whereby to disperse the solids in the tube and to impede their downward progress toward the lower end of the tube, solids and liquid mixture inlet means adjacent the upper end of the tube, and liquid outlet means adjacent the upper end of the tube above the mixture inlet means.

References Cited in the file of this patent

UNITED STATES PATENTS

| | | |
|---|---|---|
| 116,763 | Shaw | July 4, 1871 |
| 650,495 | Spencer | May 29, 1900 |
| 1,056,952 | Smith | Mar. 25, 1913 |
| 1,077,810 | Craggs | Nov. 4, 1913 |
| 1,322,487 | Falley | Nov. 18, 1919 |
| 1,332,751 | Polo | Mar. 2, 1920 |
| 1,647,310 | Richardson | Nov. 1, 1927 |
| 1,888,131 | Humphrey | Nov. 15, 1932 |
| 2,276,539 | Finney | Mar. 17, 1942 |
| 2,474,059 | Morton | June 21, 1949 |
| 2,522,556 | Wuensch | Sept. 19, 1950 |
| 2,756,965 | Howe | July 31, 1956 |

FOREIGN PATENTS

| | | |
|---|---|---|
| 296,327 | Switzerland | Apr. 17, 1954 |